(12) United States Patent
Park et al.

(10) Patent No.: US 7,623,883 B2
(45) Date of Patent: Nov. 24, 2009

(54) METHOD AND SYSTEM FOR IDENTIFYING RESPONDENT CLIENT IN PUSH-TO-TALK OVER CELLULAR NETWORK

(75) Inventors: Joon-Goo Park, Yongin-si (KR); Sang-Kyung Sung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 612 days.

(21) Appl. No.: 11/370,702

(22) Filed: Mar. 8, 2006

(65) Prior Publication Data

US 2006/0205430 A1 Sep. 14, 2006

(30) Foreign Application Priority Data

Mar. 8, 2005 (KR) .................. 10-2005-0019364

(51) Int. Cl.
*H04B 7/00* (2006.01)
(52) U.S. Cl. .................. 455/519; 455/518; 709/227; 709/229; 726/3
(58) Field of Classification Search ......... 455/518–520; 709/227, 229; 726/3
See application file for complete search history.

(56) References Cited

U.S. PATENT DOCUMENTS

2005/0105511 A1 5/2005 Poikselka

| 2005/0215273 | A1 | 9/2005 | Ito |
| 2005/0265350 | A1 | 12/2005 | Narasimha et al. |
| 2005/0267969 | A1 * | 12/2005 | Poikselka et al. ........... 709/225 |
| 2006/0089998 | A1 * | 4/2006 | Kim et al. ................... 709/229 |
| 2006/0172752 | A1 * | 8/2006 | Harris et al. ................ 455/518 |

OTHER PUBLICATIONS

Raktale, 3PoC: An Architecture for Enabling Push to Talk Services in 3GPP Networks, 2005 IEEE International Conference on Personal Wireless Communications, Jan. 23-25, 2005, pp. 202-206.
Kim et al., IMS-Based Push-to-Talk Over GPRS/UMTS, Wireless Communications and Networking Conference, Mar. 13-17, 2005; pp. 2472-2477.

* cited by examiner

*Primary Examiner*—Raymond S Dean
(74) *Attorney, Agent, or Firm*—The Farrell Law Firm, LLP (57) ABSTRACT

A method provides information of a client making a first response to a network-initiated push-to-talk-over-cellular (PoC) group session when the network-initiated PoC group session is established. When it is determined that an event meeting session establishment criteria occurs at a server managing a session, the session management server sends an INVITE message to at least one client to participate in the session to be established. A response signal to the INVITE message is received from the at least one client. A message containing information of the client making the first response is sent to the client making a request to establish the session. Thus, a user is informed of identification information of an initial caller and information of a requested conference, thereby enabling a PoC group call to be smoothly performed.

25 Claims, 9 Drawing Sheets

| V = 2 | P | 10001 | PT = APP = 204 | LENGTH |
|---|---|---|---|---|
| | | | SSRC OF PoC SERVER PERFORMING THE PARTICIPATING PoC FUNCTION OF PRE-ESTABLISHED SESSION | |
| | | | NAME(ASCII) = PoC1 | |
| PoC GROUP IDENTITY | | | IDENTITY OF THE RESPONDED PoC CLIENT | |
| PoC SESSION IDENTITY OF PRE-ESTABLISHED SESSION | | | ANSWER-MODE INDICATION | PoC GROUP NAME |
| | | | ADDITIONAL INDICATION | |

FIG. 8

```
INVITE sip:poc_client_b@example.samsung.com SIP/2.0
Via: SIP/2.0/UDP poc_server_cf.example.domain.com;branch=z9hG4bK776sgdkse
From: <sip:poc_server_x@example.domain.com>;tag=49583
To: <sip:poc_client_b@example.samsung.com>
Call-ID: d432fa84b4c76e66710
CSeq: 45 INVITE
Max-Forwards: 70
Accept-Contact: *;+g.poc.talkburst;require;explicit
User-Agent: PoC-serv/OMA1.0
Contact:<sip:poc_server_x@example.domain.com>;+g.poc.talkburst;isfocus
Session-Expires:1800;refresher=uas
Content-Type: multipart/mixed;boundary="boundary1"
Content-Length: ...

--boundary1
Content-Type: application/sdp c=IN IP6 5555::aaa:bbb:ccc:ddd
m=audio 3456 RTP/AVP 98
a=rtpmap:98 AMR
a=rtcp:5560
m=application 2000 udp TBCP
a=fmtp:TBCP queuing=1; tb_priority=1

--boundary1
 Content-Type: application/resource-lists+xml
 Content-Disposition: recipient-list <?xml version="1.0" encoding="UTF-8"?>
 <resource-lists xmlns="urn:ietf:params:xml:ns:resource-lists"
           xmlns:xsi="http://www.w3.org/2001/XMLSchema-instance">
   <list>
     <entry uri="sip:poc_client_c@example.com" />
     <entry uri="sip:poc_client_d@example.org" />
     <entry uri="sip:poc_client_e@example.net" />
   </list>
    <display-text> PoC_User_C, PoC_User_D, PoC_User_E  </display-text>
 </resource-lists>
 --boundary1--
```

FIG. 9

```
INVITE sip:poc_client_a@example.samsung.com SIP/2.0
Via: SIP/2.0/UDP client_apc.domain.com;branch=z9hG4bK776sgdkse
From: <sip:poc_server_x@example.domain.com>;tag=49583
To: <sip:poc_client_a@example.samsung.com>
Call-ID: asd88asd77a@cf_x.example.domain.com
CSeq: 1 INVITE
Max-Forwards: 70
Accept-Contact: *;+g.poc.talkburst;require;explicit
User-Agent: PoC-serv/OMA1.0
Contact:<sip:poc_server_x@example.domain.com>;+g.poc.talkburst;isfocus
Session-Expires:1800;refresher=uas
Content-Type: multipart/mixed
Content-Length: ...

<Content-Type: application/sdp>
c=IN IP6 5555::aaa:bbb:ccc:ddd
m=audio 3456 RTP/AVP 97
a=rtpmap:97 AMR
a=rtcp:5560
m=application 2000 udp TBCP
a=fmtp:TBCP queuing=1; tb_priority=2

--------Boundary1
Content-Type: application/conference-info+xml
<?xml version="1.0" encoding="UTF-8"?>
  <conference-info xmlns="urn:ietf:params:xml:ns:conference-info"
      xmlns:xsi="http://www.w3.org/2001/XMLSchema-instance">
    <conference-description>
        <conf-uris>
          <entry>
            <display-name>Regular conference</display-name>
            <uri>tel:+82312795839</uri>
          </entry>
        </conf-uris>
    </conference-description>
      <users>
        <user entity="sip:client_b@oma.example.com" state="full">
          <display-text>First accepted target User </display-text>
          <endpoint entity="sip:client_b@client_bpc.chicago.example.com">
            <state>connected</state>
            <joining-method>dialed-out</joining-method>
            <media id="1" state="full">
             <display-text>Main Audio</display-text>
             <proto>audio</proto>
             <src-id>583398</src-id>
             <state>sendrecv</state>
            </media>
            <media id="2" state="full">
             <proto>video</proto>
             <src-id>345212</src-id>
             <state>sendrecv</state>
            </media>
          </endpoint>
        </user>
      </users>
  </conference-info>
```

METHOD AND SYSTEM FOR IDENTIFYING RESPONDENT CLIENT IN PUSH-TO-TALK OVER CELLULAR NETWORK

PRIORITY

This application claims the benefit under 35 U.S.C. §119(a) from an application entitled "METHOD AND SYSTEM FOR IDENTIFYING RESPONDENT CLIENT IN PUSH-TO-TALK OVER CELLULAR NETWORK" filed in the Korean Intellectual Property Office on Mar. 8, 2005 and assigned Serial No. 2005-19364, the contents of which are incorporated herein by reference.

BACKGROUND OF THE INVENTION

1. Field of the Invention

The present invention relates to session establishment for push-to-talk-over-cellular (PoC) group call services, and more particularly, to a method and system for providing information of a client making a first response to a newly-established network-initiated PoC group session.

2. Description of the Related Art

Significant developments in mobile communications technology and the extension of mobile communications networks have resulted in the development of a vast array of services and applications for use with a cellular phone. At the same time, demand among cellular phone users for these additional services, such as a location, multimedia and a push-to-talk (PTT) service, is increasing. The PTT service supports various supplementary functions such as an instant messenger function and a status display function, as well as a group call and a voice call which are also provided by an existing radio or a trunk radio system (TRS).

Currently, standardization of a push-to-talk-over-cellular (PoC) service that employs the PTT function in a mobile communication network is taking place. A unique feature of the PoC service is that a user can participate in a plurality of PoC sessions and can also use a call service while switching from the PoC sessions as desired. This feature is a requirement that is specified in the open mobile alliance (OMA), which is a forum for specifying mobile communications services.

Figure 1:
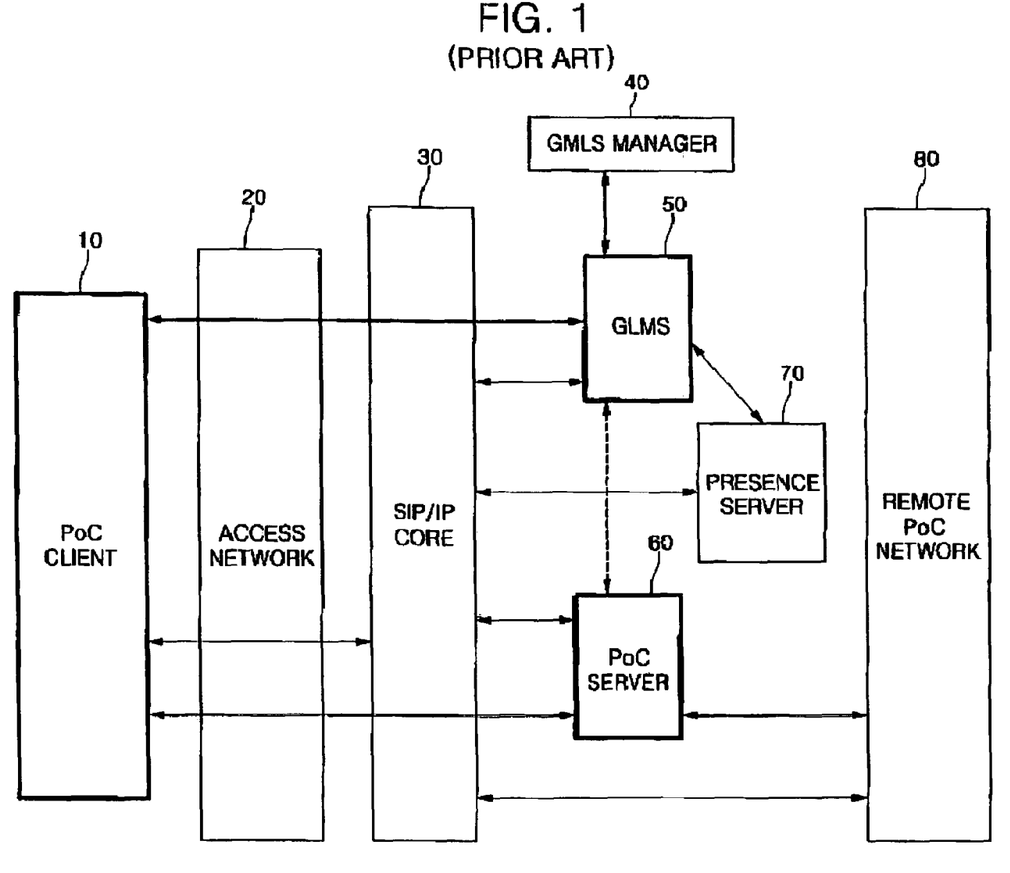
FIG. 1 is a schematic diagram illustrating a conventional PoC service system.

FIG. 1 is a schematic diagram illustrating a conventional PoC service system. Referring to FIG. 1, a PoC client 10, as a service requester installed in a mobile station, is generally connected to a Session Initiation Protocol/Internet Protocol (SIP/IP) core network 30 that supports SIP and IP multimedia functions via an access network 20.

The PoC client 10 resides in a PoC user terminal to provide access to the PoC service. The PoC client 10 mainly serves to establish, participate in and terminate a PoC session. In addition, the PoC client 10 makes and transfers a talk burst, supports an instant personal alert and performs authentication when accessing the PoC service. Hereinafter, unless otherwise stated, the PoC client 10 is assumed to be the same as a PoC service subscriber or PoC terminal.

The SIP/IP core network 30 is connected to a PoC server 60, a GLMS (Group List and Management System) 50 and a presence server 70 in order to support the PoC service. The PoC server 60 performs a Controlling PoC Function for maintaining and managing a PoC session, or a Participating PoC Function for participating in a PoC session for a one-to-one PoC call or a one-to-two or more PoC call (group PoC call).

Figure 2:
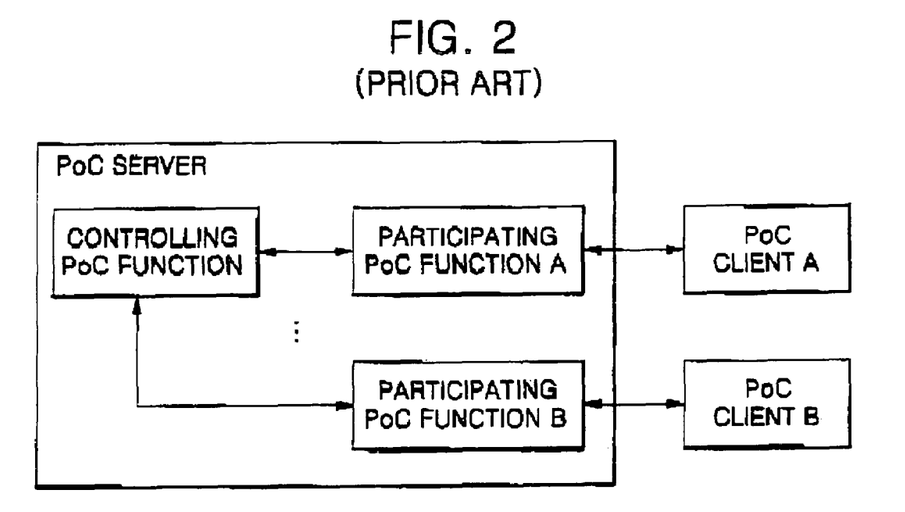
FIG. 2 is a schematic diagram showing the structure of a conventional PoC server.

Functional blocks of the PoC server will be explained below with reference to FIG. 2, a schematic diagram showing the structure of an ordinary PoC server. The PoC server performs a Controlling PoC Function (CF) of controlling overall maintenance and management of a PoC session, and a Participating PoC Function (PF) of controlling maintenance and management between each PoC session, which will be explained below with reference to Tables 1 and 2.

TABLE 1

| Controlling PoC Function (CF) |
|---|
| Provides centralized PoC session handling |
| Provides centralized Media distribution |
| Provides centralized Talk Burst Arbitration functionality including talker identification |
| Provides SIP session handling, such as SIP session origination, termination, etc. |
| Provides policy enforcement for participation in group sessions |
| Provides participant information |
| Collects and provides centralized media quality information |
| Provides centralized charging reports |
| May provide transcoding between different codecs |
| Supports Talk Burst Control Protocol Negotiation |

As shown in Table 1, the CF serves to maintain and manage a PoC session. The PoC server receives requests for the floor from PoC clients, arranges an order in which to give the clients the floor, and gives the clients the floor in that order. The PoC server also distributes a talk burst, for which an arbitrary PoC client makes a request, to all other PoC clients participating in a group PoC call, and provides information of the PoC clients participating in the group PoC call.

As shown in Table 2 below, the PF manages a PoC session between the CF and each PoC client. Particularly, the PF relays the floor between the PoC client and the CF when the PoC client makes a request for the floor or when the CF gives the floor to the PoC client. In addition, the PF relays media between the CF and the PoC client, performs transcoding between different codecs, and filters one of two concurrent PoC sessions according to the choice of a PoC user when there is simultaneous talking in the two active PoC sessions.

TABLE 2

| Participating PoC Function (PF) |
|---|
| Provides PoC session handling |
| May provide the Media relay function between PoC client and Controlling PoC server |
| May provide user media adaptation procedures |
| May provide the Talk Burst control message relay function between PoC client and Controlling PoC server |
| Provides SIP session handling, such as SIP session origination, termination, etc, on behalf of the represented PoC client. |
| Provides policy enforcement for incoming PoC session (e.g. access control, incoming PoC session barring, availability status, etc.) |
| May collect and provide media quality information |
| Provides participant charging reports |
| May provide filtering of media streams in the case of simultaneous sessions |
| May provide transcoding between different codecs |
| May support Talk Burst Control Protocol Negotiation |
| Stores the current Answer Mode and Incoming PoC Session Barring preferences of the PoC client |

In the PoC service system described above, the PoC user can input information on a group and its members to the GLMS 50 through his/her PoC terminal, and can receive information about PoC users whom he or she can call through an individual or group list transmitted from the GLMS 50. Alternatively, the information on the group and its members may be input, modified and managed in the GLMS 50 via a reliable communication network such as the Internet or an Intranet.

In order to use the PoC service, the PoC user registers his/her PoC address with the SIP/IP core network 30. The SIP/IP core network 30 stores PoC user information at the request of the PoC user. Thus, when another PoC user tries to request a group PoC call, the PoC user registers his/her information in the SIP/IP core network 30 in advance, and requests the group PoC call to his/her SIP/IP core network 30 by using group identification information transmitted from the GLMS 50. At this time, the SIP/IP core network 30 performs address determination and domain location determination by using information of the call requesting PoC user and then transfers a PoC call request to a home PoC server with which the call requesting PoC user is registered. In regard to the PoC call request, the PoC server prepares to establish a PoC session, obtains each user's information from the GLMS, and then transfers a PoC call request signal to a corresponding SIP/IP core network. When a PoC call request is made to users within an Intradomain, the PoC server performs both the CF and PF. The PoC server, which manages a call-requested PoC user, requests a PoC call to the PoC user after the SIP/IP core network performs the locating procedure, by using information it receives from the PoC user that is transmitted to the PoC server.

Figure 3:
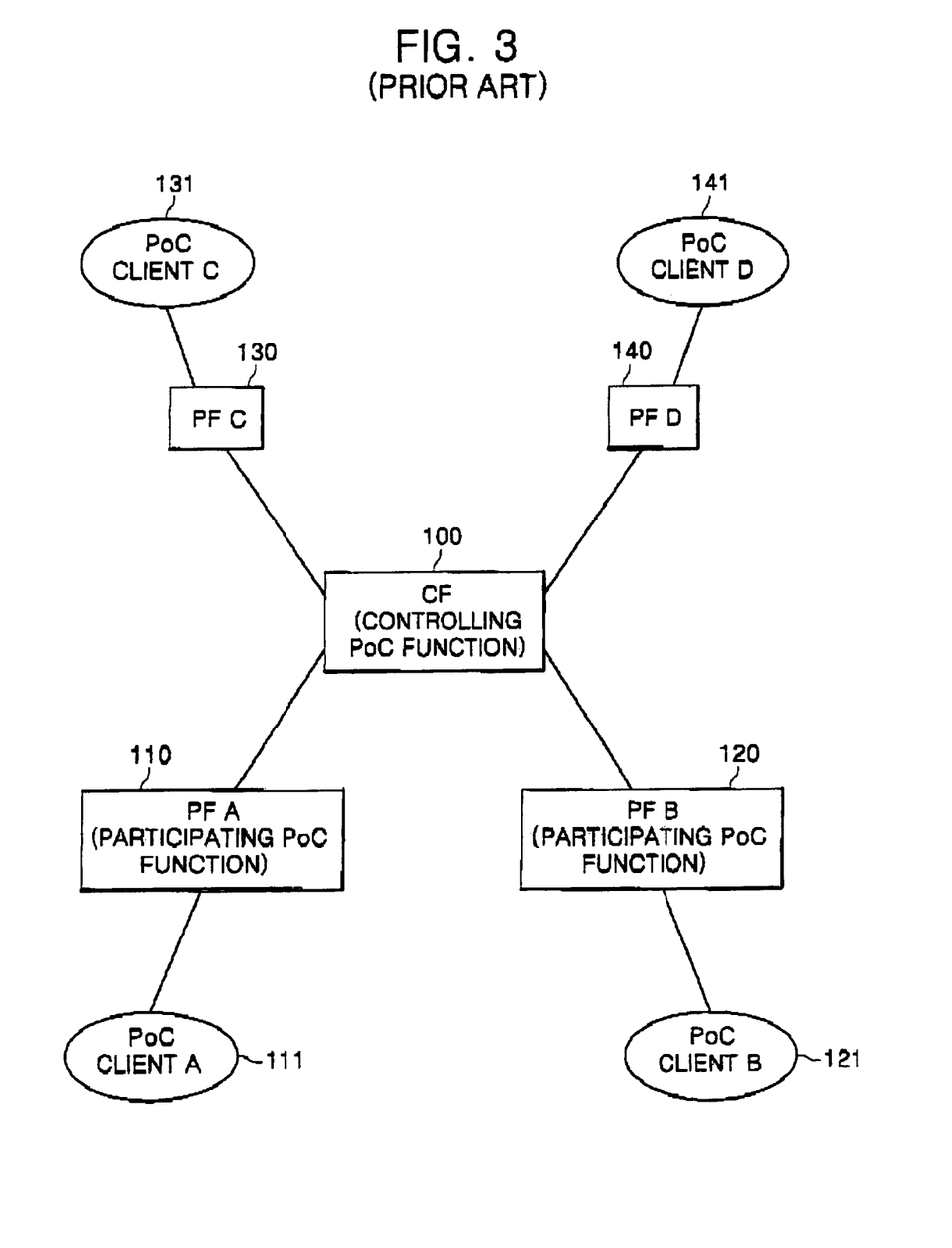
FIG. 3 is a schematic diagram of CF and PF blocks of a conventional PoC server.

FIG. 3 is a schematic diagram of CF and PF blocks of a PoC server. Referring to FIG. 3, PoC clients 111, 121, 131 and 141 provide access to a CF 100 through PFs 110, 120, 130 and 140 respectively, thereby establishing a PoC session. Here, when the floor is granted to a requester qualified as a talker from the CF 100, media based on speaking of the corresponding PoC client is transmitted to each PoC client.

First, the terminating side can set up its own answering modes according to the request of a PoC user. The answering modes can be generally divided into an auto answer mode and a manual answer mode.

The auto answer mode refers to sending an immediate answer to the originating side in a corresponding network in place of the manual answer of a receiver when included in a PoC user list designated on the terminating side. The auto answer is sent instead of operating the terminal in the network because the PoC server has a function of storing the answer mode and the corresponding user list according to a request of the terminal to set up the answer mode. Meanwhile, the manual answer mode corresponds to when the user is not included in an auto answer user list or the answer is ambiguous, or when the receiver sets up all users to make the manual answer, and indicates that a PoC call request is transmitted to the user's terminal through a receiving network and a call is connected by approval of the PoC user.

Second, the PoC system is divided into an on-demand session mode and a pre-established (or early) session mode, according to the connection set up with a PoC server within a user's home network.

The pre-established session mode is designed so that the PoC user sets up a session between a PoC client and a PoC server belonging to a PoC user's home network in advance by PoC user's request. The pre-established session enables the PoC user to negotiate media parameters to be used with the PoC server in advance, and thus perform rapid call setup without renegotiating the media parameters to be used in the future between the PoC server and client. In order to set up the pre-established session, the PoC client provides supported media parameters to a Session Description Protocol Multipurpose Internet Mail Extensions (SDP MIME) body through a method of SIP INVITE, and responds to the media parameters provided from the PoC server. The PoC client sends, to the PoC user, identification information of the pre-established session for a response message received from the PoC server, together with a conference Uniform Resource Identifier (URI). When using the pre-established session, it is possible to pre-negotiate such parameters as an IP address, a port number, a codec to be used and a talk burst control protocol.

The on-demand session mode refers to a state in which the PoC user does not set up the pre-established session, and indicates that the PoC user performs a PoC call connecting procedure after receiving an INVITE message of another PoC user.

Meanwhile, the PoC specification that is being standardized in the OMA has the following features in addition to the aforementioned fundamental functions of the communication system.

First, the PoC service supports the multilateral conference function of a half-duplex communication mode, as well as various types according to an objective of the PoC group. Specifically, a PoC conference is divided into an ad-hoc PoC group, a pre-arranged PoC group and a chat PoC group according to the feature of a participating group. First, the ad-hoc and pre-arranged PoC groups involve session establishment of dial-out to request for session setup to a conference server and forwarding the session establishment request from a server (conference server) acting as a focus to each client of interest. Next, the chat PoC group involves session establishment of dial-in to a conference server because each client is aware of information of the session of interest.

Next, the setup of the answer mode according to the call request in the PoC system can be stored both in the PoC server as an element on the network and in the PoC client as a user side terminal. In particular, when being set up for the home network managing the PoC client, the answer mode is realized by the PoC server acting as the participating PoC function (PF) in the home network to which the PoC client belongs. In this manner, in the case of setting up the answer mode of the network side, the PF automatically answers the call request of the network with a session progress message as soon as the PoC call is requested by another PoC server. Thereby, the call request procedure can be easily performed as compared with the procedure where a session setup message is transmitted to the PoC client and then the PoC client answers the session setup message. Accordingly, an initial time to grant the floor can be saved.

Meanwhile, a PoC session control network including the CF sends an INVITE request message to a terminating side network, and then receives a response message. SIP messages with which the terminating side network responds may comprise provisional response messages of 1XX, successful response messages of 2XX, or error response messages of 4XX, 5XX and 6XX according to setup of the terminating side network and PF. In the case of an AUTO-ANSWER response, the CF can receive a signal SIP 183 Session Progress, thus establishing a connection between the PoC server and client in the IMS network of a call requester. A call acceptance signal of the receiver is sent as the SIP 183 Session Process or SIP 200 OK response, and transmitted to the PoC client A via the PoC servers of the CF and PF. After receiving the 200 OK response or 183 Session Progress signal from the terminating PoC server, the CF determines that the PoC call is connected and then sends a signal Floor Granted that grants a talk burst floor, to the PoC client A. Granting talk burst authority according to the response (200 OK or 183 Session Progress) can be divided into confirmed and unconfirmed types. In the case of receiving an unconfirmed response, the CF requires a buffering function.

Meanwhile, after receiving a response signal with respect to an INVITE request signal, a PoC client A of the originating side receives a Floor Granted signal sending a talk burst transmission enable signal (ring back tone) using Real-Time Transfer Protocol (RTP) Control Protocol (RTCP). The Floor Granted signal is generated from the CF having authority to arbitrate the talk burst, and sent to the PoC client via the PF managing the corresponding PoC client. Here, the Floor Granted signal can be sent without passing through the SIP/IP core network since it uses a bearer's route instead of an SIP. The PoC user who finally confirms the ring back tone sends a media stream (e.g. voice) using RTP.

The conventional session establishment process of a PoC client using a pre-established session will be described below with reference to FIG. 4.

Figure 4:
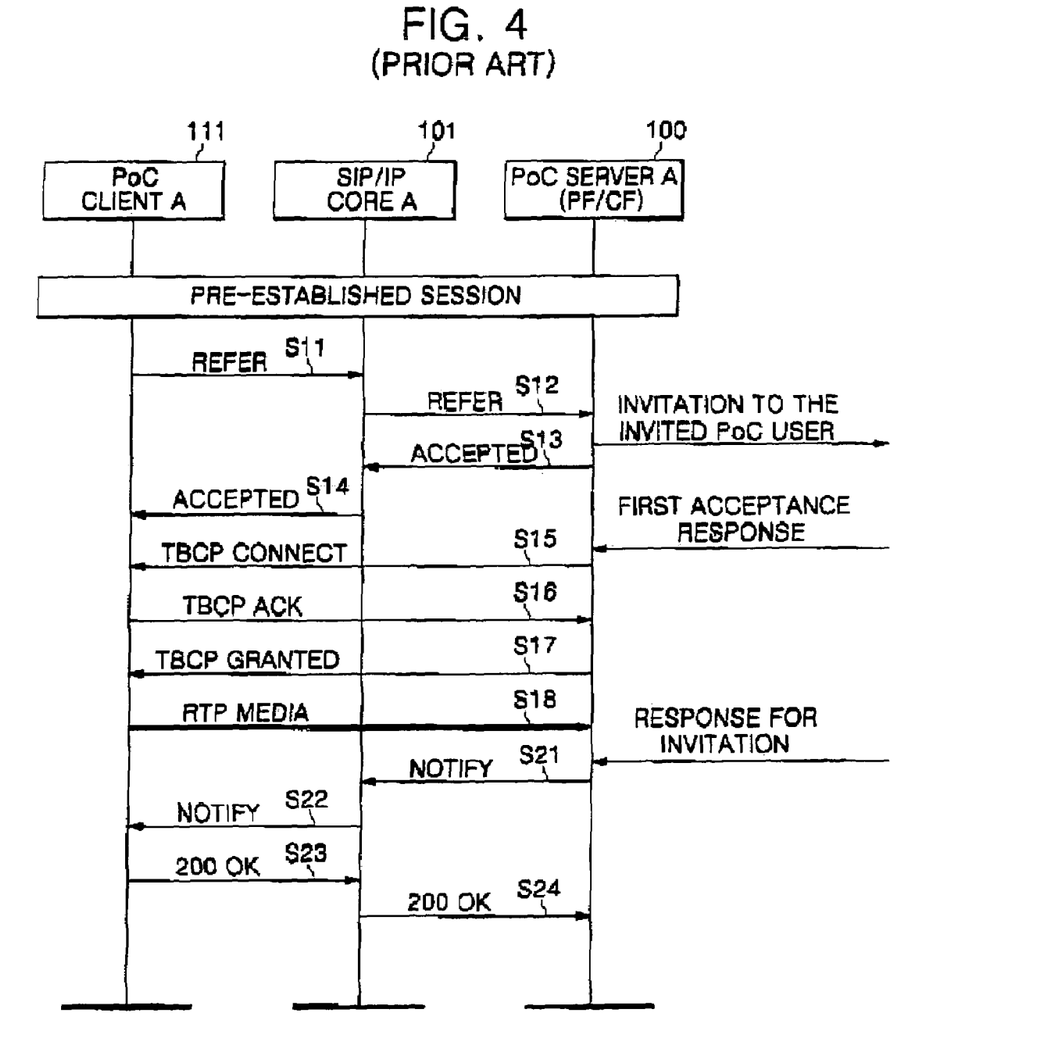
FIG. 4 shows a signaling flow for the session establishment process of a PoC client using a conventional pre-established session.

In FIG. 4, the PoC client A 111 of an originating side forwards terminating side group information (a URI list including address information of terminating side clients) and various pieces of information for session establishment (PoC group identifier, pre-established session URI, session type URI parameter and SIP request method) through a SIP REFER message (S11 and S12), and receives a response to the SIP REFER message (S13 and S14). Then, a PoC server A 100 receiving the SIP REFER message sends an INVITE message for a session request to a corresponding address. When receiving a first response to the INVITE message, the PoC server A 100 notifies that the session is connected (S15), forwards a Talk Burst Control Protocol (TBCP) message for granting the floor to the originating side PoC client A 111 (S17), and sends media (S18).

A protocol used for the TBCP message in practice uses RTCP application (RTCP APP). The session connection and the floor are given when the terminating side makes the first response in order to swiftly granting the floor in the beginning. The foregoing procedure connects the session with the PoC user who makes the first response, sends the media, and then receives information of the users responding to the session request through a NOTIFY message (S21 and S22) and acknowledges the same through a 200 OK message (S23 and S24). The TBCP message forwards PoC group information requested by the originating side client in the form of a PoC session identifier and a PoC group identity, but does not contain information of the terminating side client who made the first response to the session request, thereby making it impossible to know to whom the user of the PoC client obtaining the floor first grants the floor. Further, a time delay results between grant and release of the floor for mutual identification of users who are initially connected, and thus constitutes inefficient use of resources.

In addition, the terminating side receiving the request for session connection fails to get information on a list of participants in an ad-hoc group, making it difficult to determine an attribute of the session in which the terminating side participates.

SUMMARY OF THE INVENTION

It is an object of the present invention to provide a method for providing identifiers such as information on a display name or address of a first respondent of a terminating side when the floor is initially granted to a session establisher in a PoC group session setup procedure.

It is another object of the present invention to enable a PoC server to provide a terminating side client with information on additional users invited to a group when a specific subscription session is an ad-hoc group.

In order to accomplish these objectives, the present invention is directed to showing that the identification information can be forwarded using an SIP protocol by defining the message format and corresponding fields of a TBCP protocol forwarded through the pre-established session and taking into account a more ordinary PoC group session even when a PoC server and conference server of the pre-established session are not compatible with each other.

According to the present invention, there is provided a method for providing information of a client making a first response in a push-to-talk-over-cellular (PoC) network, including sending, by the session management server, an INVITE message to each of a plurality of clients to participate in the session to be established when it is determined that an event meeting session establishment criteria occurs at a server managing a session, receiving a first response signal to the INVITE message from one of the plurality of clients, and sending a message including information of the one of the plurality of clients making the first response to at least another of the plurality of clients, to request establishment of the session.

According to the present invention, there is provided a system for providing information of a client making a first response in a push-to-talk-over-cellular (PoC) network, including an initiating client for requesting that a session be established, at least one participating client for participating in the session, and a session management server for managing the session between the initiating client and the at least one participating client, by sending an INVITE message to the initiating client and the at least one participating client to participate in the session to be established when an event meeting the session establishment criteria is met, and sending a first response message including information on a first one of the initiating client and the at least one participating client to respond to the INVITE message to at least one other client that has been sent the INVITE message.

According to the present invention, there is provided a session management server for providing information of a client making a first response in a push-to-talk-over-cellular (PoC) network, wherein, when session establishment information is received from a terminal and an event meeting session establishment criteria received from the terminal is met, the session management server sends an INVITE message to clients to participate in a session to be established and sends a message including information of a first one of the clients making a response to the INVITE message.

BRIEF DESCRIPTION OF THE DRAWINGS

The above and other objects, features and advantages of the present invention will be more clearly understood from the following detailed description, taken in conjunction with the accompanying drawings, in which:

FIG. 9 shows an SIP INVITE message for forwarding a list of receivers in a network-initiated ad-hoc session.

DETAILED DESCRIPTION OF EXEMPLARY EMBODIMENTS

Hereinafter, exemplary embodiments of the present invention will be described in full detail with reference to the accompanying drawings. In the following description, a detailed description of known functions and configurations incorporated herein has been omitted for the sake of clarity and conciseness.

First, the present invention is constructed of a subordinate network (SIP/IP core network, radio access network, etc.) connected at both ends with a conventional PoC system, PoC terminal and PoC server. The PoC terminal comprises a PoC client for using PoC services, and the PoC server operates as CF or PF according to the owner of a PoC group session. The details of the conventional PoC system have been described in connection with the conventional art and thus ARE omitted here.

Figure 5:
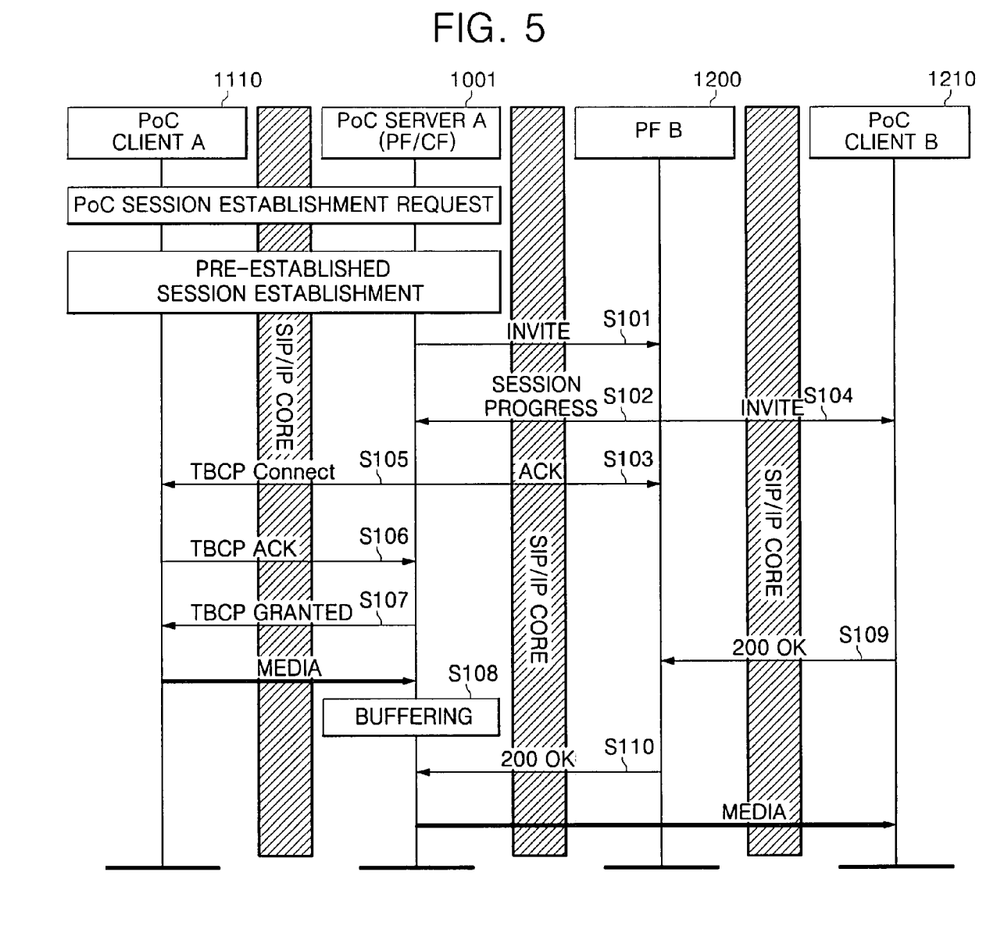
FIG. 5 shows a signaling flow for a process of identifying a subscription session and a respondent when an ad-hoc PoC group call is made using a pre-established session in accordance with a first embodiment of the present invention.

FIG. 5 shows a procedure of forwarding information on a group and respondent client through a pre-established session when a network-initiated ad-hoc PoC session is established by forwarding information on the group to a terminating side client, and thus receiving a first response to the request when a request to establish the network-initiated ad-hoc PoC session is made to a PoC client with whom a pre-established session has been set up.

In FIG. 5, it is assumed that subscription information on PoC session establishment is set for a PoC server, and then a PoC client sets up a pre-established session. The subscription information on PoC session establishment can be set up by performing service setting on a SIP PUBLISH message. Information set for the server comprises an event initiating session connection, and in the case of a group call, the identity of a corresponding group or a URI list of members of an ad-hoc group. The PoC server sends an INVITE message to corresponding members by triggering a preset event (S101). At this time, the INVITE message comprises a group identity and the requester identifier of a network-initiated session.

The group identity is forwarded as a PoC group identity taking the URI format of a pre-arranged group or chat group, and comprises an URI list of corresponding members in the case of the ad-hoc group. A format of the INVITE message (S101) in which the URI list of the ad-hoc group members is included will be described below with reference to FIG. 9.

Meanwhile, when an auto answer mode is set for the PF of a terminating side, the PF sends a provisional response 183 Session Progress (S102), and selectively receives an acknowledge (ACK) signal that acknowledges the provisional response (S103). Further, the PF sends the ad-hoc group member information received in step S101 to a corresponding terminating side client (S104).

After receiving the provisional response (S102), a CF forwards a Talk Burst Control Protocol (TBCP) message informing that the session is connected to a PoC client A 1110 connected by the pre-established session (S105). At this time, the TBCP message comprises the PoC group identity (to confirm whether it is the same as the session identifier generated when the pre-established session is set up) indicating that the session is connected, and the identifier of the terminating side client who responds first. A detailed Real-time Transport Protocol Control Protocol Application (RTCP APP) format of the TBCP message will be described with reference to FIG. 7.

The PoC client A 1110 performs procedures of granting the floor and sending a media after identifying the respondent client. Then, the CF buffers the media (S108), and then receives a final response (200 OK) (S110). Thereafter, the media is forwarded to a corresponding PoC client B 1210.

Figure 6:
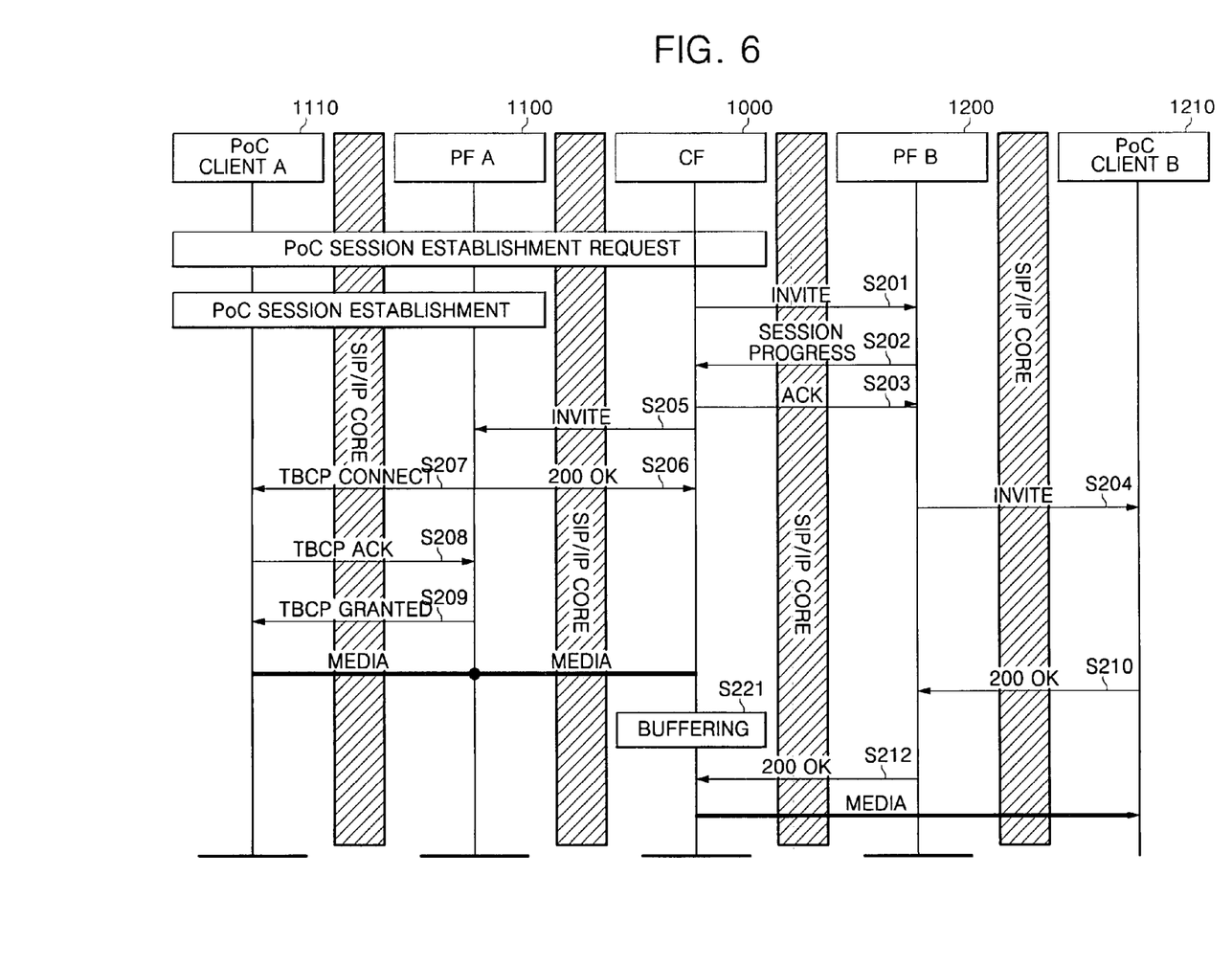
FIG. 6 shows a signaling flow for a process of identifying a subscription session and a respondent when a PoC group call is made using a pre-established session in accordance with a second embodiment of the present invention.

FIG. 6 shows a plan for forwarding the same identification information when a PoC server is not the same as a PF setting up a pre-established session in the process of FIG. 5. Steps S201, S202, S203 and S204 of FIG. 6 are the same as steps S101, S102, S103 and S104, respectively, of FIG. 5. However, since a server hosting a conference is not the same as a PF connected through the pre-established session, there is a need for a process (S205) of sending an INVITE message for a session request between two servers. At this time, the INVITE message includes information on an established group and a client sending a response. A format of the INVITE message will be described with reference to FIG. 8.

Meanwhile, after receiving the SIP INVITE message in step S205, a PF A 1100 sends a TBCP Connect message through a pre-established session (S207). Here, the TBCP Connect message includes information on an established PoC group and identification information on a respondent client, as in FIG. 5. Thereafter, processes of granting the floor, sending a media, and buffering the media are the same as those of FIG. 5.

The procedures of FIGS. 5 and 6 apply to a particular case wherein the pre-established session exists on the side of the PoC client A, and the auto answer mode is set up on the terminating side (PoC client B). Thus, the principle of the present invention can be equally applied to a modified establishment procedure according to various modes (answer mode, pre-established session mode, on-demand mode, etc.) of the PoC service.

Figure 7:
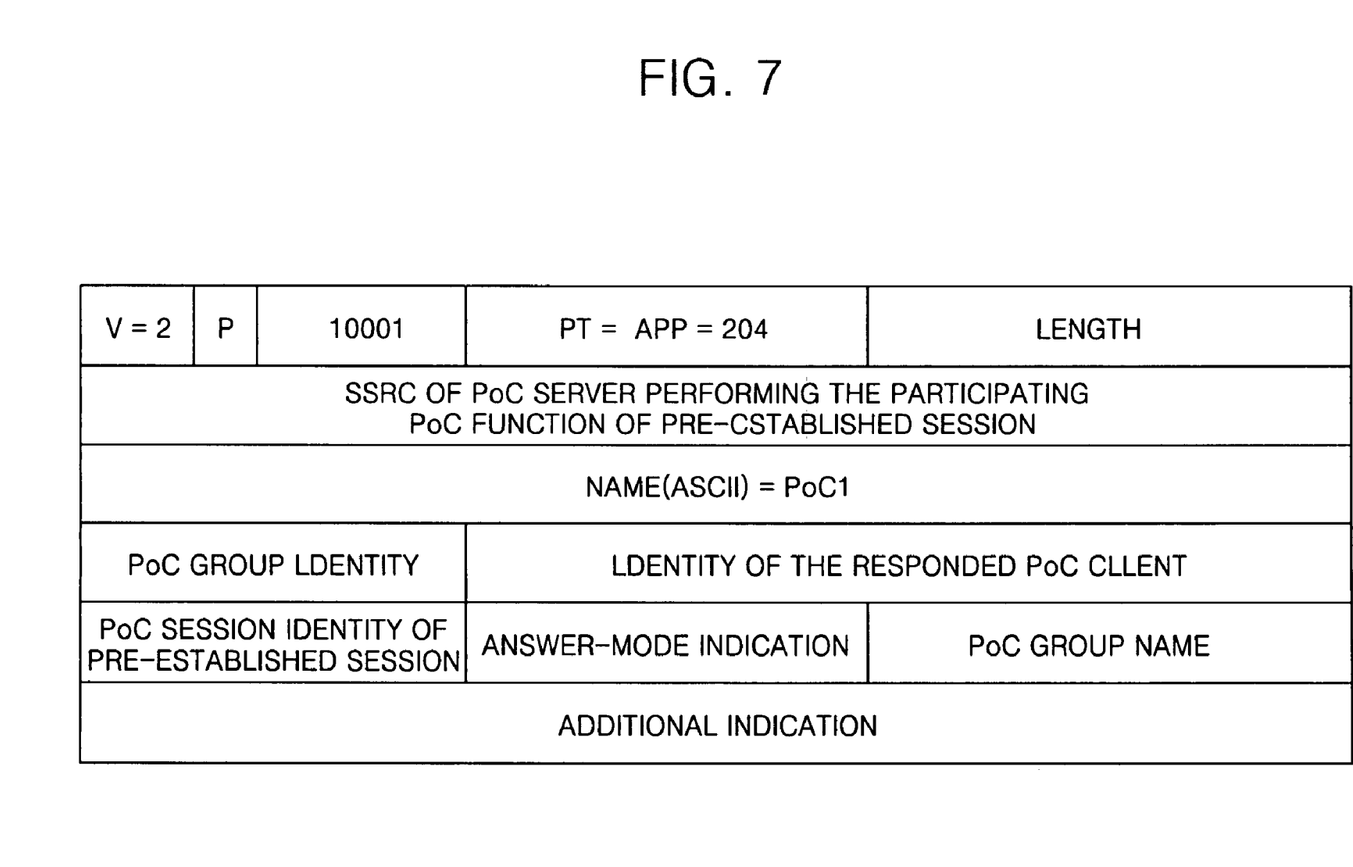
FIG. 7 shows an RTCP payload format for implementing the present invention.

FIG. 7 shows a format and fields of a TBCP Connect message forwarded through a pre-established session in the processes of FIGS. 5 and 6. The TBCP message is composed of an RTCP packet according to the OMA standard for PoC Release 1. The RTCP packet requires RTCP transmission-related general information such as version information, packet type, sub-type information, packet length etc., and such information as the address and name of a PoC user and the talk burst connection. In the present invention, the RTCP packet comprises identification information of a respondent client and the PoC group of a network-initiated session.

Figure 8:
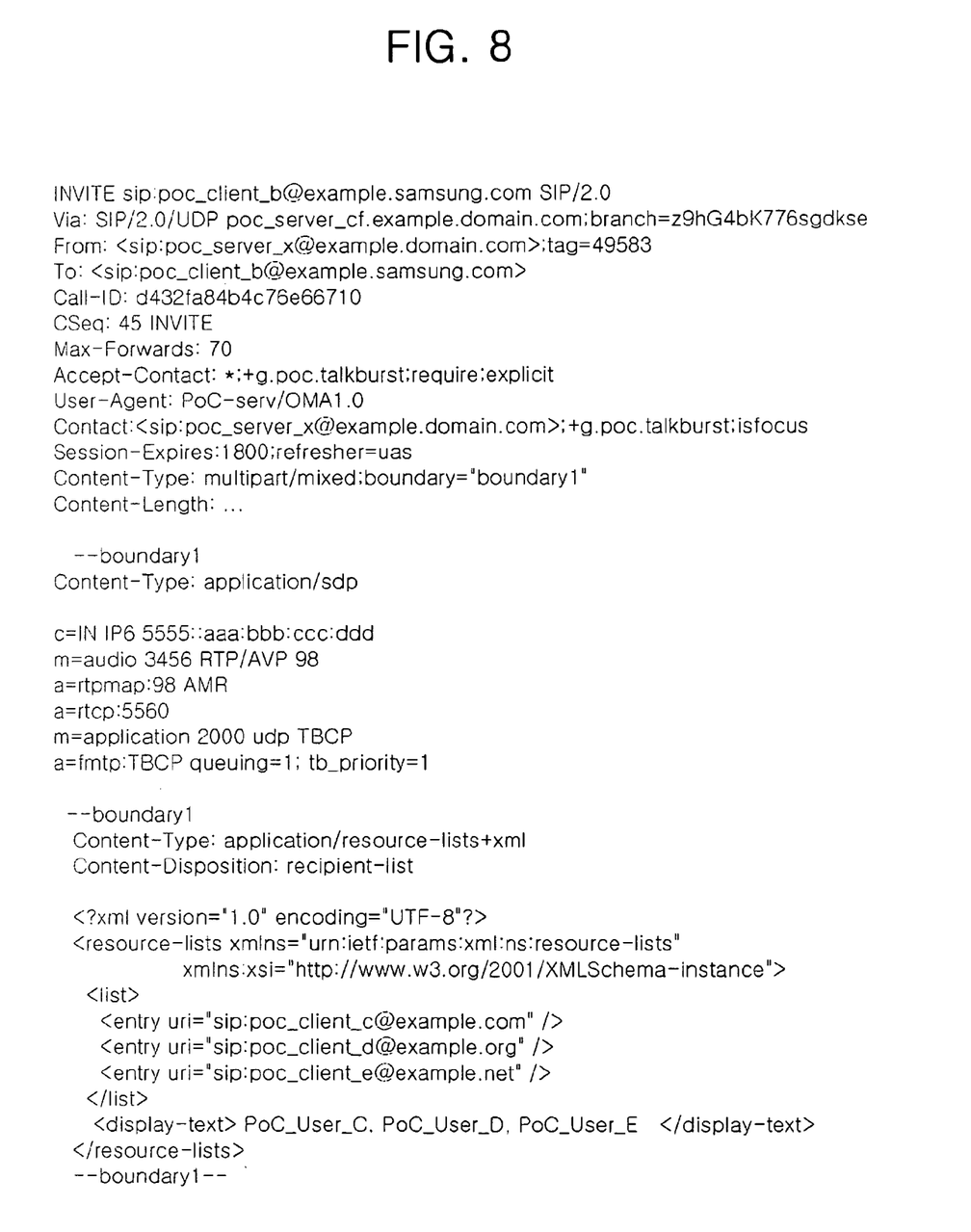
FIG. 8 shows an INVITE message for identifying a subscription session and a respondent in order to implement the present invention.

FIG. 8 shows an SIP INVITE message for forwarding identification information of a respondent client.

In the INVITE message, general headers and contents are not described. Rather, the following description regards the header and contents of particular importance in the present invention.

First, a CF notifies that a URI included in a header field concerns the address of a conference server managing a request PoC group call by adding an "isfocus" tag to a "Contact" header of the INVITE message. Next, the portion composed of MIME contents comprises an SDP offer part for general media negotiation, and an XML part for information transmission of a corresponding conference. To this end, the header part has the field value of a content-type "multipart/mixed." To forward information of a target PoC client who responds to the conference first, a field "conference-info" registered with IANA indicating a subscription conference can be used. At this time, general information on the subscription conference can be obtained through a field value "conference-description," and detailed information on the PoC client accessing the conference can be obtained through a field value "users" up to a PoC address of the corresponding client, machine address and state used for access, a method of participating in the conference, and an attribute according to each media type.

Identification information of a respondent and a group session when a network-initiated session is initially established can be forwarded through the "conference-info" field. Further, the two pieces of identification information can be reprocessed into a TBCP message using the "conference-info" field at the PF, and forwarded to the target client.

FIG. 9 shows an SIP INVITE message for forwarding a receiver list to the target client in a network-initiated ad-hoc session. (e.g., steps S201 to S204 in FIG. 6)

Similar to FIG. 8, a CF first notifies that a URI included in a header field concerns the address of a conference server managing a request PoC group call by adding an "isfocus" tag to a "Contact" header of the INVITE message. Next, the portion of the message composed of MIME contents comprises an SDP offer part for general media negotiation, and an XML part for information transmission of a corresponding conference. In order to forward information on members of an ad-hoc group in the XML part, a field "resource-lists" registered with IANA can be used. Thereby, information on the address of a PoC client requested to connect to an ad-hoc session is forwarded to each terminating PoC client through the value of a field "list." Parameters included in the "list" field can be included with the SIP URI and user name (display name) mapped with each other, but only information of the user name may be sent if necessary.

Only two pieces of identification information of a group and a respondent client can be forwarded through the INVITE message. The other additional information of FIGS. 8 and 9 can be omitted.

In the procedure of establishing the session for the group call using the conventional PoC technology, the initial session is connected by the terminating PoC client receiving the first successful SIP response signal, and thus the floor is granted to the originating PoC client. At this time, no identification information of the initial respondent is sent, so that a proper call is made until the user granted the floor identifies his/her target. In addition, in the case of the network-initiated PoC group session, the user subscribing to the session needs to confirm which group call the SIP session request made to the user indicates.

According to the present invention, in the PoC group session initiated from the network by such necessity, when the pre-established session is set up by the subscriber to the session, the user is notified of identification information of an initial caller and information of a requested conference, hence the PoC group call is smoothly performed. In addition, when subscription to the ad-hoc group is made, information on a list of corresponding call recipients is forwarded to the terminating PoC client. Thus, the receiver to whom a request to participate in the group session is made can selectively decide about session participation based on the member information.

While the present invention has been described with reference to exemplary embodiments thereof, it will be understood by those skilled in the art that various changes in from and detail may be made therein without departing from the scope of the present invention as defined by the following claims.

What is claimed is:

1. A method for providing information of a client making a first response in a push-to-talk-over-cellular (PoC) network, the method comprising the steps of:
   sending, by a session management server, an INVITE message to each of a plurality of clients to participate in a session to be established, when it is determined that an event meeting session establishment criteria occurs;
   receiving a first response signal to the INVITE message from one of the plurality of clients; and
   sending a message including information of the one of the plurality of clients making the first response to at least another of the plurality of clients, to request establishment of the session,
   wherein the INVITE message includes information on a group identity of an originating side client of a session establishment requester and information on an identifier of a network-initiated session establishment requester.

2. The method according to claim 1, wherein the step of sending the INVITE message comprises
   adding an isfocus tag to a contact field to indicate that a Uniform Resource Identifier (URI) contained in the contact field is address information of a conference server managing a requested PoC group call, and indicating receiver information of an ad-hoc group in a resource-list field of the message.

3. The method according to claim 1, wherein the step of receiving the first response signal to the INVITE message comprises receiving a provisional response message from a terminating side session relaying server, when a Participating PoC Function (PF) relaying a terminating side session is set to an auto answer mode.

4. The method according to claim 1, wherein the step of receiving the first response signal to the INVITE message comprises receiving an OK response message from a terminating side client, when a Participating PoC Function (PF) relaying a terminating side session is set to a manual answer mode.

5. The method according to claim 1, wherein the step of sending the message including the information of the one of the plurality of clients making the first response to the at least another of the plurality of clients making the request to establish the session comprises sending information on a group identity and an identifier of a network-initiated session establishment requester to the session establishment requesting client using a Talk Burst Control Protocol (TBCP), when subscription information on network-initiated session establishment is set for a Controlling PoC Function (CF) of a session management server and an originating side client sets up a session.

6. The method according to claim 5, wherein the message including the information of the one of the plurality of clients making the first response to the at least another of the plurality of clients making the request to establish the session uses a Real-time Transport Protocol (RTP) Control Protocol Application (RTCP APP) format.

7. The method according to claim 6, wherein the RTCP APP message format includes:
   a field for Real-time Transport Control Protocol (RTCP)-related information including at least one of version information, packet type, sub-type information, packet length, information on the address and name of a client, and information on talk burst connection;
   a field for identification information of a respondent client; and a field for group identification information of a network-initiated session.

8. The method according to claim 1, wherein the step of sending the message including the information of the one of the plurality of clients making the first response to the at least another of the plurality of clients making the request to establish the session comprises:

sending, by a Controlling PoC Function (CF) of a session management server, information on a group identity and an identifier of a network-initiated session establishment requester to a Participating PoC Function (PF) of the session to which the session establishment requester belongs; and sending, by the PF of the session to which the session establishment requester belongs, information on the group identity and the identifier of the network-initiated session establishment requester to the session establishment requesting client using a Talk Burst Control Protocol (TBCP).

9. The method according to claim 8, wherein the INVITE message indicates the group identity through a conference-info field, and information on the client accessing a conference through a users sub-field of a conference description field.

10. The method according to claim 8, wherein the message including the information of the one of the plurality of clients making the first response to the at least another of the plurality of clients making the request to establish the session uses a Real-time Transport Protocol (RTP) Control Protocol Application (RTCP APP) format.

11. The method according to claim 10, wherein the RTCP APP message format includes:

a field for Real-time Transport Control Protocol (RTCP)-related information including at least one of version information, packet type, sub-type information, packet length, information on the address and name of a client, and information on talk burst connection;

a field for identification information of a respondent client; and a field for group identification information of a network-initiated session.

12. A system for providing information of a client making a first response in a push-to-talk-over-cellular (PoC) network, the system comprising:

an initiating client for requesting that a session be established;

at least one participating client for participating in the session; and a session management server for managing the session between the initiating client and the at least one participating client, by sending an INVITE message to the initiating client and the at least one participating client to participate in the session to be established when an event meeting session establishment criteria is met, and sending a first response message including information on a first one of the initiating client and the at least one participating client to respond to the INVITE message to at least one other client that has been sent the INVITE message;

wherein the INVITE message comprises information on a group identity of an originating side client of a session establishment requester, and an identifier of a network-initiated session establishment requester.

13. The system according to claim 12, wherein the INVITE message further comprises an isfocus tag in a contact field, indicating that a Uniform Resource Identifier (URI) contained in the contact field is address information of a conference server managing a requested PoC group call, and indicating receiver information of an ad-hoc group in a resource-list field of the message.

14. The system according to claim 12, wherein, when a Participating PoC Function (PF) relaying a terminating side session is set to an auto answer mode, the session management server receives a provisional response message from the terminating side session PF and processes the received message in a same manner as when a response signal is received from a terminating side client.

15. The system according to claim 12, wherein, when a PF relaying a terminating side session is set to a manual answer mode, the session management server receives an OK response message from a terminating side client and processes the received message in a same manner as when a response signal is received.

16. The system according to claim 12, wherein, when subscription information on network-initiated session establishment is set for a Controlling PoC Function (CF) of a session management server and an originating side client sets up a session, the session management server sends information on a group identity and an identifier of a network-initiated session establishment requester to a session establishment requesting client via the first response message using a Talk Burst Control Protocol (TBCP) when receiving the first response.

17. The system according to claim 16, wherein the first response message using the TBCP uses a Real-time Transport Protocol (RTP) Control Protocol Application (RTCP APP) format.

18. The system according to claim 17, wherein the RTCP APP message format comprises:

a field for Real-time Transport Control Protocol (RTCP)-related information including at least one of version information, packet type, sub-type information, packet length, information on the address and name of a client, and information on talk burst connection;

a field for identification information of a respondent client; and a field for group identification information of a network-initiated session.

19. The system according to claim 12, wherein, when receiving a response from the at least one participating client, the session management server sends information on a group identity and an identifier of a network-initiated session establishment requester from a Controlling PoC Function (CF) of the session management server to a Participating PoC Function (PF) of the session to which the session establishment requester belongs, and the PF sends information on the group identity and the identifier of the network-initiated session establishment requester to the session establishment requesting client via the first response message using a Talk Burst Control Protocol (TBCP).

20. The system according to claim 19, wherein, when the information on the group identity and the identifier of the network-initiated session establishment requester is sent to the PF, the INVITE message indicates a group identity is sent through a conference-info field belonging to the message, and indicates information on the client accessing a conference through a users sub-field of a conference description field.

21. The system according to claim 19, wherein the first response message using the TBCP uses a Real-time Transport Protocol (RTP) Control Protocol Application (RTCP APP) format.

22. The system according to claim 21, wherein the RTCP APP message format comprises:

a field for Real-time Transport Control Protocol (RTCP)-related general information including at least one of version information, packet type, sub-type information, packet length, information on the address and name of a client, and information on talk burst connection;

a field for identification information of a respondent client; and a field for group identification information of a network-initiated session.

23. The system according to claim 13, wherein the resource-list field is used to forward, to terminating PoC clients, the receiver information of the ad-hoc group, which includes an address of each PoC client connected to a session of the ad-hoc group.

24. A session management server for providing information of a first client making a response in a push-to-talk-over-cellular (PoC) network, wherein, when session establishment information received from a terminal and an event meeting session establishment criteria received from the terminal is met, the session management server sends an INVITE message to clients to participate in the session, and sends a message to the clients including information of the first client to respond to the INVITE messages wherein, when subscription information on network-initiated session establishment is set for a Controlling PoC Function (CF) of a session management server, the session management server sends information on a group identity and an identifier of a network-initiated session establishment requester to a session establishment requesting client using a Talk Burst Control Protocol (TBCP) when receiving the response from the first client.

25. The session management server according to claim 24, wherein, when receiving a response from one of the clients, the session management server sends the information on the group identity and the identifier of the network-initiated session establishment requester from the CF of the session management sewer to a Participating PoC Function (PF) of the session to which the session establishment requester belongs, and the PF sends information on the group identity and the identifier of the network-initiated session establishment requester to the session establishment requesting client using the TBCP.

* * * * *

UNITED STATES PATENT AND TRADEMARK OFFICE
CERTIFICATE OF CORRECTION

PATENT NO. : 7,623,883 B2
APPLICATION NO. : 11/370702
DATED : November 24, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this

Twenty-sixth Day of October, 2010

David J. Kappos
*Director of the United States Patent and Trademark Office*